United States Patent [19]

Turner et al.

[11] Patent Number: 4,853,009

[45] Date of Patent: Aug. 1, 1989

[54] MULTI ORIENTATION FUEL VAPOR STORAGE CANISTER ASSEMBLY

[75] Inventors: Kenneth W. Turner, Webster; Richard H. Simons, Jr.; Gordon R. Paddock, both of Rochester, all of N.Y.

[73] Assignee: General Motors Corporation, Detroit, Mich.

[21] Appl. No.: 238,789

[22] Filed: Aug. 31, 1988

[51] Int. Cl.⁴ .................................... B01D 39/00

[52] U.S. Cl. .................................... 55/387; 123/519

[58] Field of Search .................... 55/387, 316; 123/519

[56] References Cited

U.S. PATENT DOCUMENTS

| | | | |
|---|---|---|---|
| 4,683,862 | 8/1987 | Fornuto et al. | 123/520 |
| 4,684,382 | 8/1987 | Abu-Isa | 55/316 |
| 4,714,485 | 12/1987 | Covert et al. | 55/189 |
| 4,714,895 | 12/1987 | Covert et al. | 58/387 |

*Primary Examiner*—Bernard Nozick

*Attorney, Agent, or Firm*—Patrick M. Griffin

[57] ABSTRACT

A fuel vapor storage canister uses a single canister body and a series of three possible modular liquid fuel trap subassemblies that fit into a trap housing of the canister body so as to allow the assembly to be installed in three differing orientations.

3 Claims, 5 Drawing Sheets

MULTI ORIENTATION FUEL VAPOR STORAGE CANISTER ASSEMBLY

BACKGROUND OF THE INVENTION

1. Field of the Invention

This invention relates to vapor storage canisters for vehicle fuel vapor loss control systems in general, and specifically to a canister assembly kit including a canister body and a series of modular fuel trap subassemblies that allow the canister body to be installed in multiple possible orientations.

2. Description of the Related Art

Vehicle fuel vapor loss control systems typically include a vapor storage canister assembly. The canister includes a hollow body that contains a bed of fuel vapor adsorbent, usually activated carbon, and various openings to receive vapors from the fuel system, to purge out stored vapors, and to admit fresh air. Fuel vapors may be received just from the fuel tank, or, in proposed systems, from a tank vent vapor valve also, so as to control fuel fill losses.

With the prospect of increased demands on the capacity of the canister, the problems of increased canister volume and under hood packaging constraints have become a concern. Furthermore, with greater fuel vapor handling demands on the canister come more possibilities for the introduction of liquid fuel into the canister, either directly or from fuel vapor condensation. Liquid fuel can contaminate or degrade the efficiency of the adsorbent. Designs for canisters with trap chambers to keep the liquid fuel away from the adsorbent may be seen in U.S. Pat. No. 4,714,485, assigned to the assignee of the current invention. In one embodiment, an upright cylindrical canister has its adsorbent bed spaced away from the bottom of the canister, creating an internal chamber. Both the vapor inlet tube and purge tube open into the chamber, where liquid may collect and be withdrawn, isolated from the lower surface of the adsorbent bed. In another embodiment, a reclining can is first filled with a bed of adsorbent confined between a pair of filter screens. The screens are not capable of physically retaining the adsorbent, so the ends of the canister must have separate closures. One end of the canister is closed by a cap with a fresh air inlet. The opposite end of the canister is closed by two components, first a partition that opens to the adsorbent bed, and then a dish shaped cover that goes over the partition and forms a chamber. A vapor inlet and purge tube both open through the end of the cover into the chamber, with an inlet of the purge tube located near the bottom of the chamber so as to draw out trapped liquid during purge. Both the cap and cover must be glued or welded securely to the ends of the canister.

Each of the embodiments in the patent above are capable of only a single installation orientation. That is, the upright canister cannot be mounted in a reclining orientation, nor can the reclining canister be installed upright. Moreover, once the cover is attached, the reclining canister cannot be turned 90 degrees, because the purge tube would then be dislocated. In addition to requiring separate assembly steps, the use of a cover separate from the canister makes it impractical to make the cover from a material different from the canister itself, if sonic welding is to be used to attach it. Since the trap will hold liquid fuel, while the body of the canister itself will not, it may be desirable to use dissimilar materials for the two parts.

SUMMARY OF THE INVENTION

The invention provides a liquid trap protected canister assembly kit that has a reduced number of parts, and which is capable of multiple installation orientations. A single canister body has the general shape of an elongated rectangular prism, so that its cross section has a different thickness and width. Therefore, the canister body is capable of three different orientations, that is, upright, reclining with the width vertical, or reclining with the thickness vertical. This gives more flexibility in installing the canister within the under hood space available in any particular vehicle. The canister body is open at only one end. The other end is closed by a generally box shaped trap housing that is integrally molded with that end of the canister body. The trap housing has an end wall that is spaced from and generally parallel to the plane of that end of the canister body, which is also the plane where a surface of a bed of adsorbent material will eventually be located. The trap housing end wall has a centrally located purge opening, and at least one vapor fill opening that is located near a corner of the end wall. This assures that, for any of the three possible orientations of the canister body, the purge opening will remain centrally located, while the vapor fill opening can be located at a high point relative to the trap housing.

A series of modular fuel trap subassemblies is provided with the kit, each tailored to a desired installation orientation of the canister body, and each sized to slide fit into the trap housing. Each trap subassembly has a generally trough shaped catch basin that opens beneath the fill opening of the trap housing so as to collect any entering or condensing liquid fuel. One wall of the catch basin is coplanar to the end of the canister body. Each trap subassembly also has a generally T shaped, centrally located purge tube. One end of the T is sized to plug into the trap housing purge opening when the trap subassembly is added, and serves as a purge outlet. The two remaining ends of the T are oriented with one opening near the bottom of the catch basin, so as to provide a liquid inlet, while the other end of the T rests high within the catch basin, and provides a vapor inlet.

After the trap subassembly corresponding to the desired installation orientation of the canister body is fitted into the trap housing, a bed of adsorbent is added. The one wall of the trap subassembly will maintain a surface of the adsorbent spaced away from the trap housing end wall. Then, a cover is secured to the open end of the canister body, which represents the only welding or gluing operation necessary. Only a single, standard canister body is needed, and it may be formed of a material dissimilar from the trap subassemblies, as they are not physically joined. Each trap subassembly has basically the same component parts, and works in the same fashion.

It is, therefore, an object of the invention to allow multiple installation orientations for a liquid trap protected vapor storage canister.

It is another object of the invention to provide for such multiple installation orientations with a reduced number of parts.

It is another object of the invention to achieve such an assembly as a kit with a single canister body having a box shaped trap housing integrally molded at one end of the canister, and a series of modular trap subassemblies that fit into the trap housing before the adsorbent is added, each of which is tailored to a desired installation orientation.

BRIEF DESCRIPTION OF THE DRAWINGS

These and other objects and features of the invention will appear from the following written description, and from the drawings, in which.

DESCRIPTION OF THE PREFERRED EMBODIMENT

Figure 1:
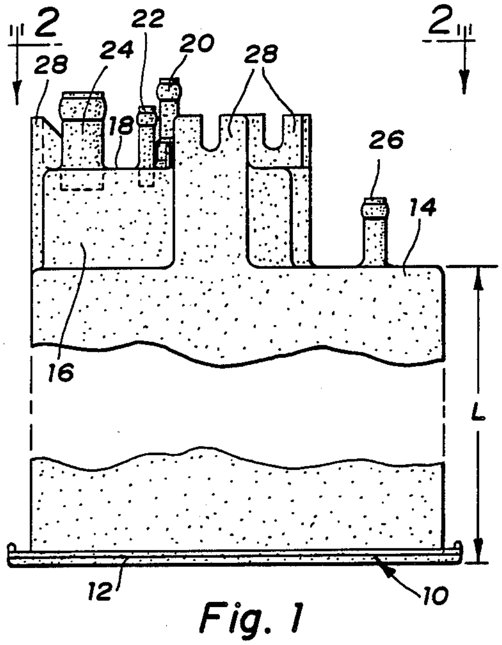
FIG. 1 is a side view of the canister body showing the two ends.
Figure 2:
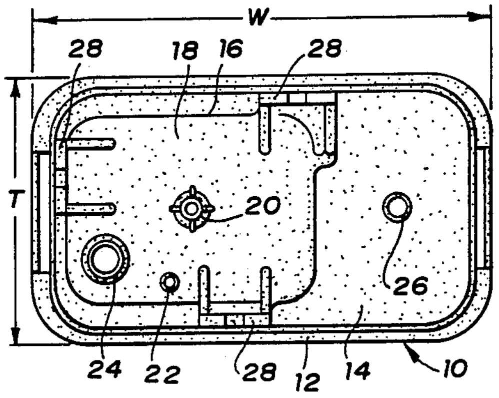
FIG. 2 is a view from the perspective of line 2—2 of FIG. 1.

Referring first to FIGS. 1 and 2, the basic component of the invention is a canister body indicated generally at 10, which is molded of a suitable plastic material. Body 10 is generally a right rectangular prism, although its edges are rounded. Canister body 10 is elongated, so its length axis is its greatest dimension, although it is shown shortened in order to fit on the page. The cross section of canister body 10 has a differing thickness and width, as best seen in FIG. 2, with the width being greater than the thickness. One end of body 10 is open, although it is shown closed by a cap 12 that is added as a last step. The other end of body 10 has an end wall 14 that is bulged out to form an integrally molded, box shaped trap housing 16, which itself has an end wall 18 parallel to body end wall 14. Integrally molded with and opening through trap housing end wall 18 are a tubular purge opening 20, tubular vapor fill opening 22 for a fuel tank, and tubular vapor fill opening 24 for a tank vapor vent valve, not illustrated. As shown by the dotted lines in FIG. 1, the tubular vapor fill openings 22 and 24 extend beyond the end wall 18 and into the interior of trap housing 16 to an extent. The vapor fill opening 24 for the TVVA is of greater diameter, in accord with its need to handle larger volumes of vapor than will come through opening 22, which handles only the diurnal tank losses. As best seen in FIG. 2, the purge opening 20 is parallel to the axis of canister body 10, and at the center of the trap housing end wall 18. The vapor fill openings 22 and 24 are near a corner of end wall 18, with opening 24 located closest to the corner. Other features of canister body 10 include a fresh air inlet tube 26 opening through end wall 14, and several slotted mounting flanges 28.

Figure 3A:
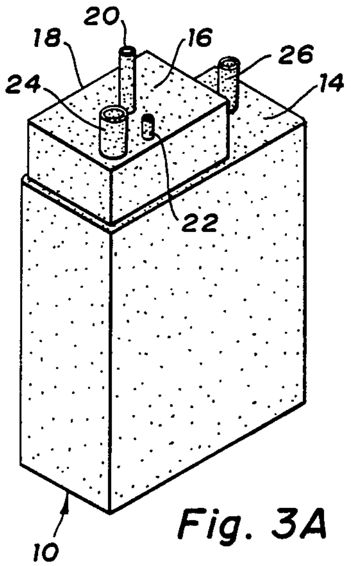
FIGS. 3A-C are diagrammatic perspective views of the three possible installation orientations of the canister body.
Figure 3B:
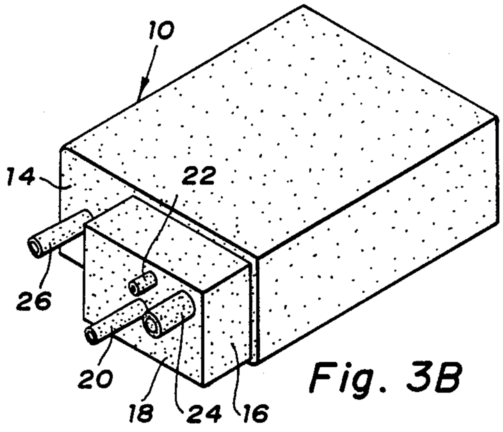
Figure 3C:
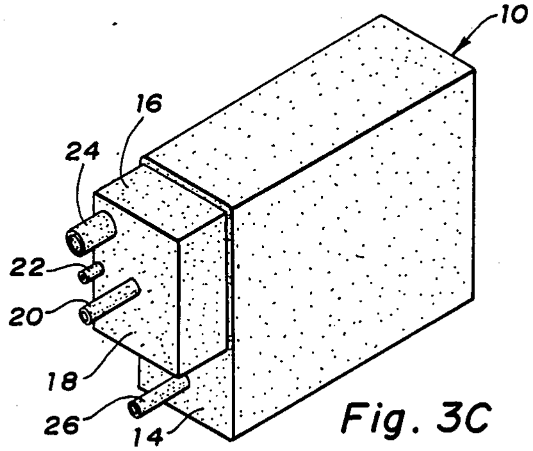

Referring next to FIG. 3, the rectangular prism shape of canister body 10 gives it three possible different installation orientations. That is, it can be mounted in 3 different ways beneath a vehicle hood, which, assuming the canister assembly can be made to work otherwise, would give it a much greater packaging flexibility. For example, in FIG. 3A, it may be mounted upright, that is, with its axis vertical. In the upright orientation, the various tubes 20, 22 and 24 have effectively the same relation to one another no matter how the canister body 10 is turned about its axis, since it makes no difference which side of purge opening 20 the fill openings 22 and 24 are on. But the purge opening 20 remains always centrally located relative to the trap housing 16 no matter how the canister body 10 is turned, and the vapor fill openings 22 and 24 are always at the highest possible point in the canister body 10. As seen in FIG. 3B and 3C, the canister body 10 may also be oriented reclining, that is, with its length horizontal. In 3B, it is shown with its thickness vertical, and in 3C, with its width vertical. In the reclining position, it does make a difference which way canister body 10 is turned, as the fill openings 22 and 24 may be either above or below the purge opening 20, that is, high or low relative to the trap housing 16. This is important to the operation of the liquid trap, as will be described below. Again, the purge opening 20 will remain central to trap housing 26 no matter how the canister body 10 is turned, in the reclining orientation. The location of the fill openings 22 and 24 near a corner of the trap housing end wall 18 means that, for either the 3B or 3C orientation, allows them to be located at a high point relative to the trap housing 16, and above the purge opening 20. This is especially evident for the larger vapor fill opening 24, which is located closest to the corner of trap housing end wall 18. Being in a corner, fill opening 24 will be effectively at the top of trap housing 16 whether it happens to be in the right upper quadrant of end wall 18, (the 3B orientation) or in the left upper quadrant of end wall 18 (the 3C orientation). The rest of the invention works in conjunction with these possible orientations of the fill openings 22 and 24 and purge opening 20 to assure that the liquid trap will in fact work for every desired installation orientation of the canister body 10.

Figure 4:
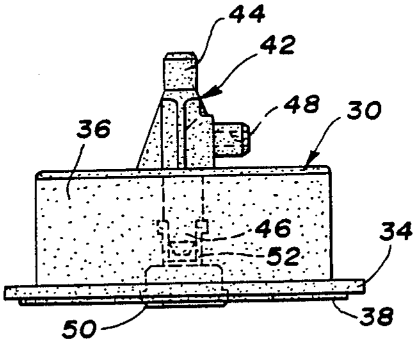
FIG. 4 is a side view of the trap subassembly used with the upright installation orientation.
Figure 5:
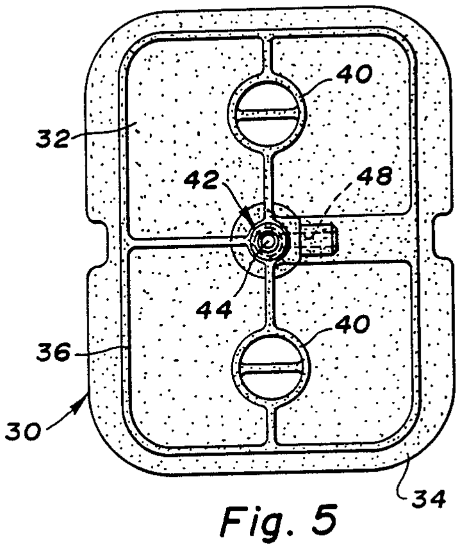
FIG. 5 is a top view of the subassembly of FIG. 4.
Figure 6:
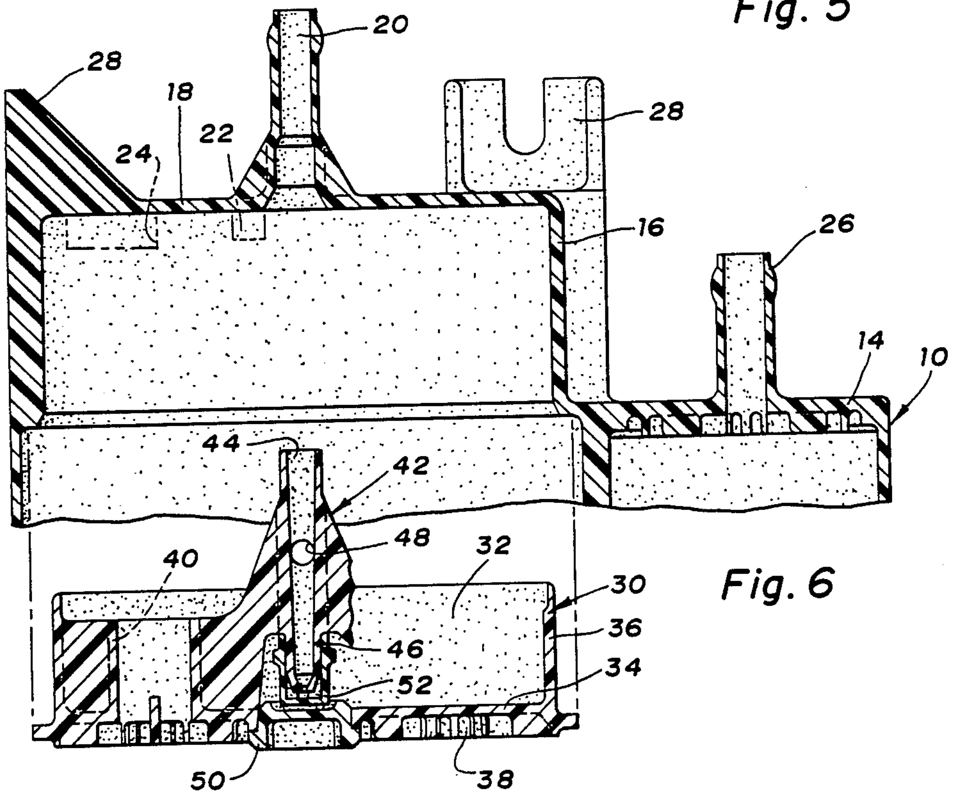
FIG. 6 is a cross sectional view of the trap housing of the canister body and of the subassembly of FIG. 4 as it is being fitted into the trap housing.

Referring next to FIGS. 4 through 6, the invention also includes a series of three modular fuel trap subassemblies, one particularly tailored to each of the three possible installation orientations of canister body 10. The subassembly in FIGS. 4-6, indicated generally at 30, is used with the upright orientation of FIG. 3A. Subassembly 30 is molded of nylon, which has good liquid fuel resistance properties and is, in general, properly sized to slide fit within trap housing 16. Specifically, trap subassembly 30 includes a generally trough shaped catch basin 32, comprised of a bottom wall 34 and a rectangular perimeter wall 36. The perimeter wall 36 is sized to fit fairly closely inside of trap housing 16. Bottom wall 34 also includes a series of ribs 38 on the outside and a pair of upstanding pipes 40 that open through 34 and stand almost as high as perimeter wall 36. Subassembly 30 also includes a T shaped purge tube indicated generally at 42. The longest part of the T is centrally located, with its uppermost end 44 properly sized to plug tightly into the trap housing purge opening 20, providing a purge outlet. The opposed lower end 46 rests low within catch basin 32, providing a liquid intake, while the perpendicular short leg of the T extends out to a side opening 48 that rests high over the catch basin 32, providing a vapor intake. Subassembly 30 may be quite easily molded by two axially parting mold parts or dies forming all surfaces except the short leg of the T. The short leg of the T would be formed by a third mold element that would be pulled 90 degrees to the other two. The mold element that forms the purge tube lower end 46 is withdrawn through a clearance passage that is later filled by a plug 50. Before plug 50 is added, a cover and filter screen element 52 is fitted over end 46.

Figure 7:
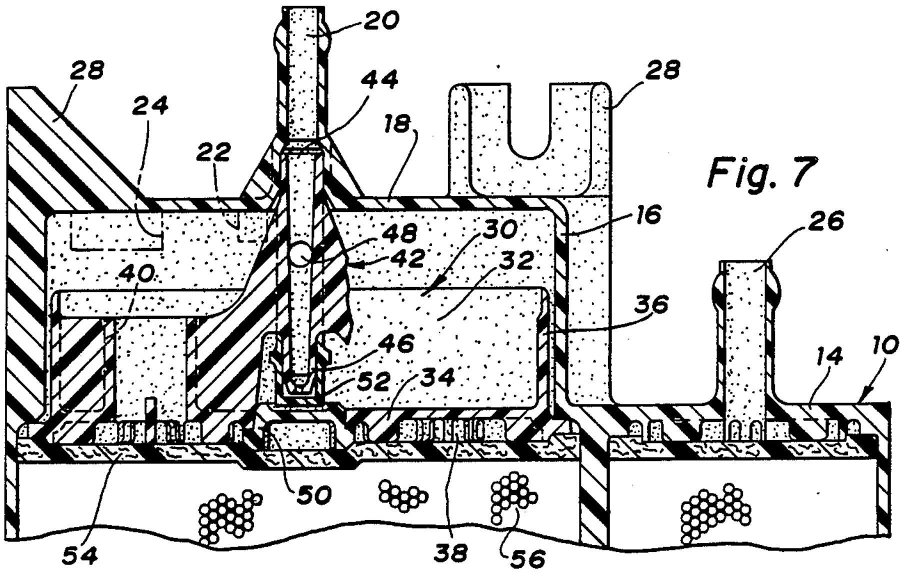
FIG. 7 is a view showing the subassembly of FIG. 4 in place, with the adsorbent bed added.

Referring next to FIGS. 1, 6 and 7, to complete the canister assembly, trap subassembly 30 is moved from the FIG. 6 to the FIG. 7 position. No direct welding or gluing of subassembly 30 into trap housing 16 is necessary, it is strictly a slide fit. Concurrently, the purge tube upper end 44 plugs into the trap housing purge opening 20 and the catch basin bottom wall 34 moves coplanar with canister body end wall 14. The vapor fill openings 22 and 24 then rest over catch basin 32, but not directly over the upstanding pipes 40. Next, a screen 54 is pressed up against the undersurface of bottom wall 34, and a bed of adsorbent 56 is added. Finally, cap 12 is secured to the bottom of canister body 10 to complete the canister assembly of the invention. The upper surface of bed 56 will be kept spaced from and parallel to the trap housing end wall 18 by the bottom wall 34 with no necessity of welding in a separate partition or cover as an additional assembly step. The canister body 10 would then be mounted by the flanges 28. After installation, the various tubes 20, 22, 24 would be connected to appropriate hose lines, not illustrated. During vapor fill, a fuel vapor and air mixture would enter the fill openings 22 and 24. Any liquid fuel entering directly, or condensing, would fill the catch basin 32 beneath the fill openings 22 and 24, without reaching the adsorbent bed 56. Fuel vapor and air could enter the pipes 40, flowing through the manifold area created by the ribs 38 and into the bed 56, where the fuel vapor component of the mixture would be adsorbed. Air would exit the tube 26. During purge, suction would be applied to the purge opening 20 and through purge tube upper end 44, ultimately reaching both of the other purge tube ends 46 and 48. Concurrently, collected liquid fuel would be drawn out of catch basin 32 through the purge tube lower end 46, and fresh air would be drawn in tube 26 and through adsorbent bed 56, desorbing stored fuel vapor, which would enter trap housing 16 through pipes 40 and then be drawn in side opening 48 and ultimately exit through purge opening 20. The other two trap subassemblies are installed and work in basically the same fashion, and may be described more briefly.

Figure 8:
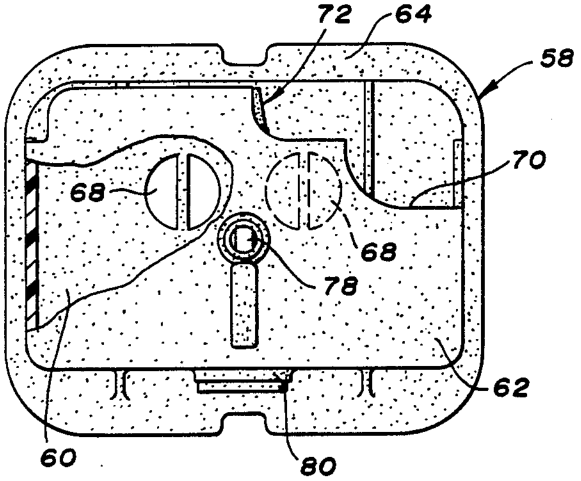
FIG. 8 is an end view of the trap subassembly used with the FIG. 3B installation orientation the canister body.
Figure 9:
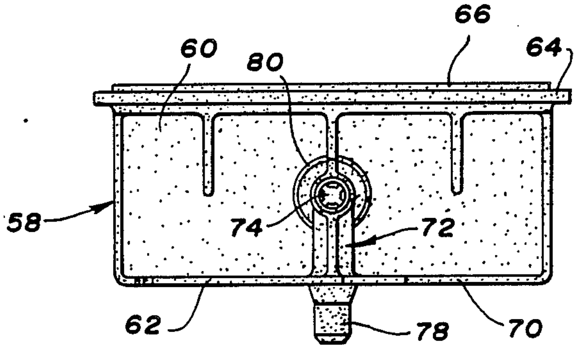
FIG. 9 is a top view of the subassembly of FIG. 8.
Figure 10:
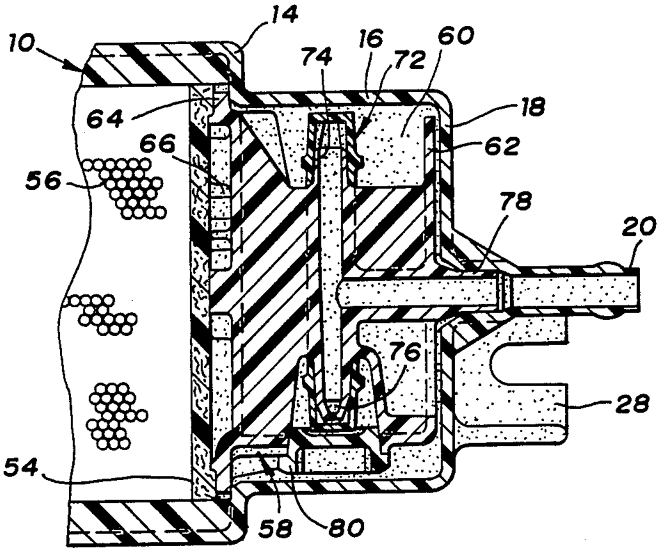
FIG. 10 is a view like FIG. 7, but showing the subassembly of FIG. 8 in place.
Figure 11:
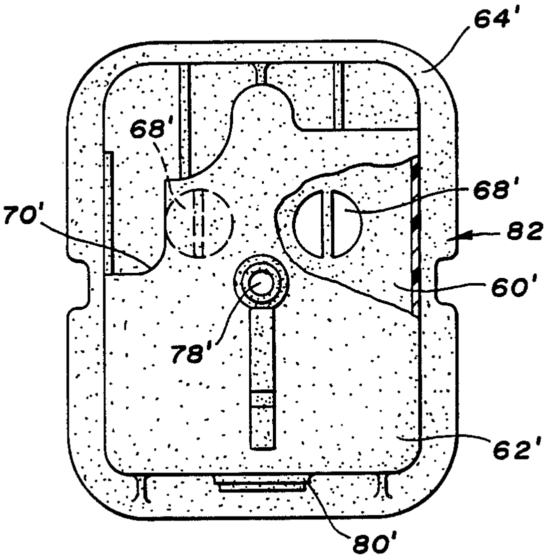
FIG. 11 is an end view of the trap subassembly used with the FIG. 3C installation orientation of the canister body.
Figure 12:
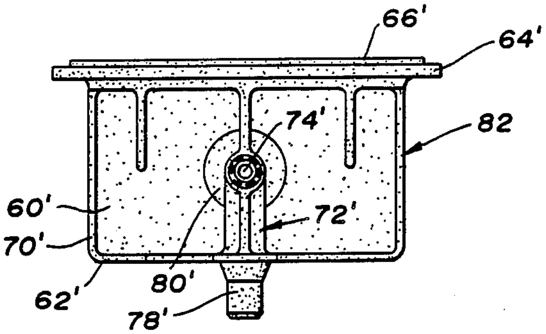
FIG. 12 is a top view of the subassembly of FIG. 11.
Figure 13:
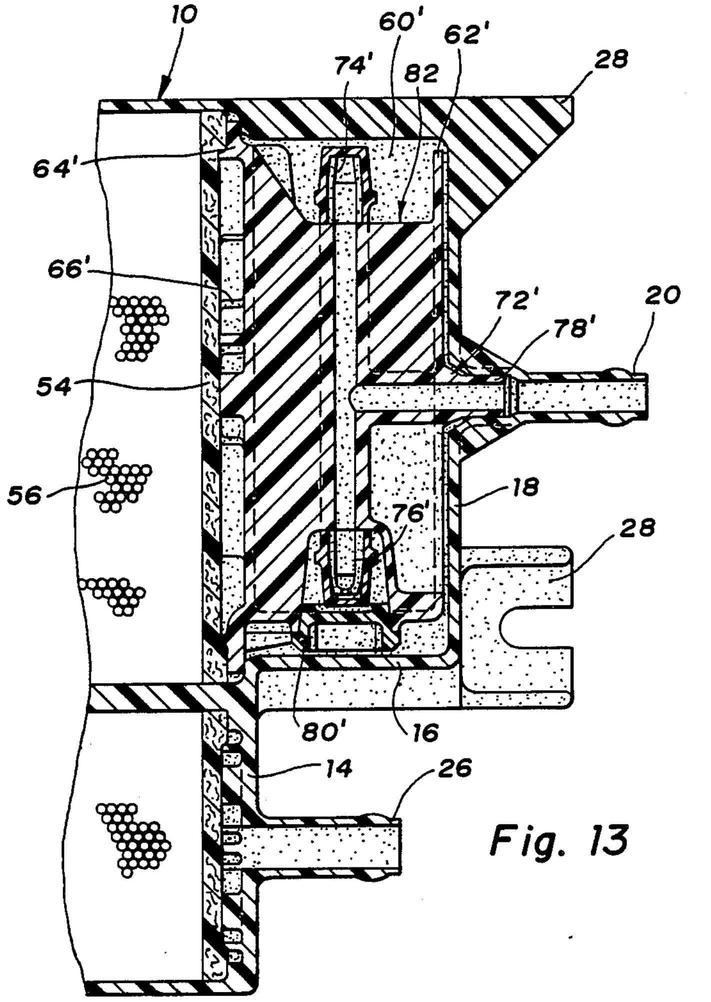
FIG. 13 is a view like FIG. 7, but shows the subassembly of FIG. 11 in place.

Referring next to FIGS. 8 through 10, and to FIGS. 11 through 13, the subassemblies used with the other two possible installation orientations are shown. Referring first to FIGS. 8–10, the trap subassembly used for the FIG. 3B installation orientation is indicated generally at 58. Subassembly 58 is molded of the same material and by the same process as subassembly 30. Subassembly 58 has a trough shaped catch basin 60 formed, in part, by a front wall 62 and parallel back wall 64. The outer surface of back wall 64 is ribbed at 66 and has a pair of ports 68 cut therethrough, above the bottom of catch basin 60. The top corner of front wall 62 is cutout at 70 to allow the fill tubes 22 and 24 to extend past it and overlie the catch basin 60. A T shaped purge tube indicated generally at 72 has an upper end 74 located in high above the bottom of catch basin 60, a lower end 76 located near the bottom, and a side opening that is sized to plug into trap housing purge opening 20. As with subassembly 30, the purge tube lower end 76 is molded with a mold element withdrawn through a clearance hole that is later filled with a plug 80. As subassembly 58 is fitted into trap housing 16, front wall 62 moves very close to trap housing end wall 18 and purge tube side opening 78 plugs into purge opening 20. Then, the same filter screen 54 and adsorbent bed 56 are added. Vapor fill operation is basically the same as described above. Any liquid fuel or vapor entering fill openings 22 and 24 that condenses, fills catch basin 60, and is prevented from falling down the interface between front wall 62 and end wall 18 by the fact that the fill tubes 22 and 24 extend past front wall 62. Vapor purge is essentially identical to that of subassembly 30. Referring next to FIGS. 11–13, the trap subassembly 82 used with the FIG. 3C installation orientation may be very simply described, as it has essentially the same elements, but turned 90 degrees. It is molded in the same fashion of the same material, and operates identically. Corresponding parts are simply given the same number with a prime.

So, with a single canister body and three different modular, plug-in trap assemblies, a canister assembly with three feasible installation orientations is achieved. Protection against liquid fuel contamination is had with a minimal number of parts and assembly steps. Variations of the embodiment disclosed would be possible. For example, while the trap housing purge tube and subassembly purge opening will conveniently be centrally located, they need not be dead center to the trap housing, so long as they have the plug together relationship described. The near dead center location works particularly well with the T shaped purge tube, however, as it creates a symmetrical T with three available spaced openings that may used interchangeably to provide the purge outlet, liquid intake or vapor intake depending upon orientation. A different purge tube could be used, even one that was a separate piece, so long as it had an outlet designed to plug into the trap housing purge opening. The T shaped purge tube is particularly advantageous to mold, however. It is not absolutely necessary that an integral wall of the catch basin move into coplanar relation with the end wall of the canister body to hold and space the surface of the adsorbent bed away from the end wall of the trap housing. That function could be provided by a separately added partition. However, it is a definite added advantage to have that catch basin wall provide double duty, in effect, as it eliminates a part and simplifies assembly. Therefore, it will be understood that the invention is not intended to be limited to just the preferred embodiment disclosed.

The embodiments of the invention in which an exclusive property or privilege is claimed are defined as follows:

1. A fuel vapor storage canister assembly kit capable of multi orientation installation in a vehicle, comprising,
   an elongated canister body having a generally rectangular cross section of differing thickness and width,
   a bed of fuel vapor adsorbent material for said canister to define an adsorbent surface proximate one end of said canister body,
   a generally box shaped trap housing located at said one end of said canister body and having an end wall spaced from and generally parallel to said adsorbent surface, said housing end wall further including a centrally located purge opening and a vapor fill opening located near a corner of said end wall so that, for multiple possible installation orientations of said canister body, including upright, reclining with vertically oriented thickness, and reclining with vertically oriented width, said fill opening may be located at a high point relative to said trap housing and said purge opening will remain at a central location, and, a series of modular fuel trap subassemblies of sizes to fit within said trap housing, one for each desired installation orientation of said canister body, each trap subassembly having a catch basin oriented beneath said trap housing fill opening so as to collect any liquid fuel entering said trap housing and a purge tube including an outlet sized to plug into said trap housing purge opening, whereby, for any desired installation orientation, the appropriate fuel trap subassembly may be chosen from the kit and fitted within said trap housing before the addition of said adsorbent material, allowing multiple installation orientations with a single canister body.

2. A fuel vapor storage canister assembly kit capable of multi orientation installation in a vehicle, comprising, an elongated canister body having a generally rectangular cross section of differing thickness and width, a bed of fuel vapor adsorbent material for said canister, a generally box shaped trap housing located at one end of said canister body and having an end wall with a centrally located purge opening and a vapor fill opening located near a corner of said end wall so that, for multiple possible installation orientations of said canister body, including upright, reclining with vertically oriented thickness, and reclining with vertically oriented width, said fill opening may be located at a high point relative to said trap housing and said purge opening will remain at a central location, and, a series of modular fuel trap subassemblies of sizes to fit within said trap housing, one for each desired installation orientation of said canister body, each trap subassembly having a generally trough shaped catch basin oriented beneath said trap housing fill opening so as to collect any liquid fuel entering said trap housing with one wall of said catch basin resting against said adsorbent so as to maintain a surface of said adsorbent spaced from said trap housing end wall, said fuel trap subassembly further including a purge tube with an outlet sized to plug into said trap housing purge opening, whereby, for any desired installation orientation, the appropriate fuel trap subassembly may be chosen from the kit and fitted within said trap housing before the addition of said adsorbent material, allowing multiple installation orientations with a single canister body.

3. A fuel vapor storage canister assembly kit capable of multi orientation installation in a vehicle, comprising, an elongated canister body having a generally rectangular cross section of differing thickness and width, a bed of fuel vapor adsorbent material for said canister to define an adsorbent surface proximate one end of said canister body, a generally box shaped trap housing located at said one end of said canister body and having an end wall spaced from and generally parallel to said adsorbent surface, said housing end wall further including a centrally located purge opening and a vapor fill opening located near a corner of said end wall so that, for multiple possible installation orientations of said canister body, including upright, reclining with vertically oriented thickness, and reclining with vertically oriented width, said fill opening may be located at a high point relative to said trap housing and said purge opening will remain at a central location, and, a series of modular fuel trap subassemblies of sizes to fit within said trap housing, one for each desired installation orientation of said canister body, each trap subassembly having a catch basin oriented beneath said trap housing fill opening so as to collect any liquid fuel entering said trap housing and a generally T shaped purge tube, with the opening at one end of said T shaped purge tube being sized to plug into said trap housing purge opening so as to serve as a purge outlet, and with the other two ends of said T shaped purge tube being located near the bottom of said catch basin and near the top of said catch basin respectively, so as to serve as a liquid intake and vapor intake respectively, whereby, for any desired installation orientation, the appropriate fuel trap subassembly may be chosen from the kit and fitted within said trap housing before the addition of said adsorbent material, allowing multiple installation orientations with a single canister body.

* * * * *